United States Patent [19]

Nikkel

[11] Patent Number: 4,764,236
[45] Date of Patent: Aug. 16, 1988

[54] CORRUGATING MACHINE GLUE APPLICATOR

[75] Inventor: Willem A. Nikkel, Covington, Va.

[73] Assignee: Westvaco Corporation, New York, N.Y.

[21] Appl. No.: 64,506

[22] Filed: Jun. 22, 1987

[51] Int. Cl.⁴ .............................................. B32B 31/12
[52] U.S. Cl. ................................... 156/210; 118/248; 156/205; 156/470; 156/497; 156/578
[58] Field of Search ............... 156/578, 497, 473, 210, 156/470–472, 205; 384/100, 106, 114, 116, 119; 226/95, 97, 168; 118/248, 253

[56] References Cited

U.S. PATENT DOCUMENTS

| | | | |
|---|---|---|---|
| 3,289,906 | 12/1966 | Schuller | 226/168 |
| 3,676,247 | 7/1972 | Morris et al. | |
| 3,690,981 | 9/1972 | Di Frank et al. | |
| 3,712,843 | 1/1973 | Gartagania et al. | |
| 3,864,185 | 2/1974 | Johnson et al. | |
| 3,994,367 | 11/1976 | Christ | 384/106 |
| 4,316,755 | 2/1982 | Flaum et al. | |
| 4,337,884 | 7/1982 | Hirakawa et al. | 226/168 |
| 4,521,121 | 6/1985 | Klein | 384/100 |
| 4,530,227 | 7/1985 | Schlatter et al. | 384/116 |
| 4,617,076 | 10/1986 | Jones, Jr. et al. | |

Primary Examiner—David Simmons
Attorney, Agent, or Firm—W. A. Marcontell; R. L. Schmalz

[57] ABSTRACT

In the fabrication of double-faced corrugated paperboard, the exposed flute tips of single-faced corrugated board are prepared with a coating of liquid adhesive to receive a second liner web. To press the flute tips uniformly against the adhesive film coated surface of a glue applicator roll, pressure is applied by a segmented air bearing wherein multiple air bearing shoe segments are resiliently secured to a common manifold air source.

8 Claims, 2 Drawing Sheets

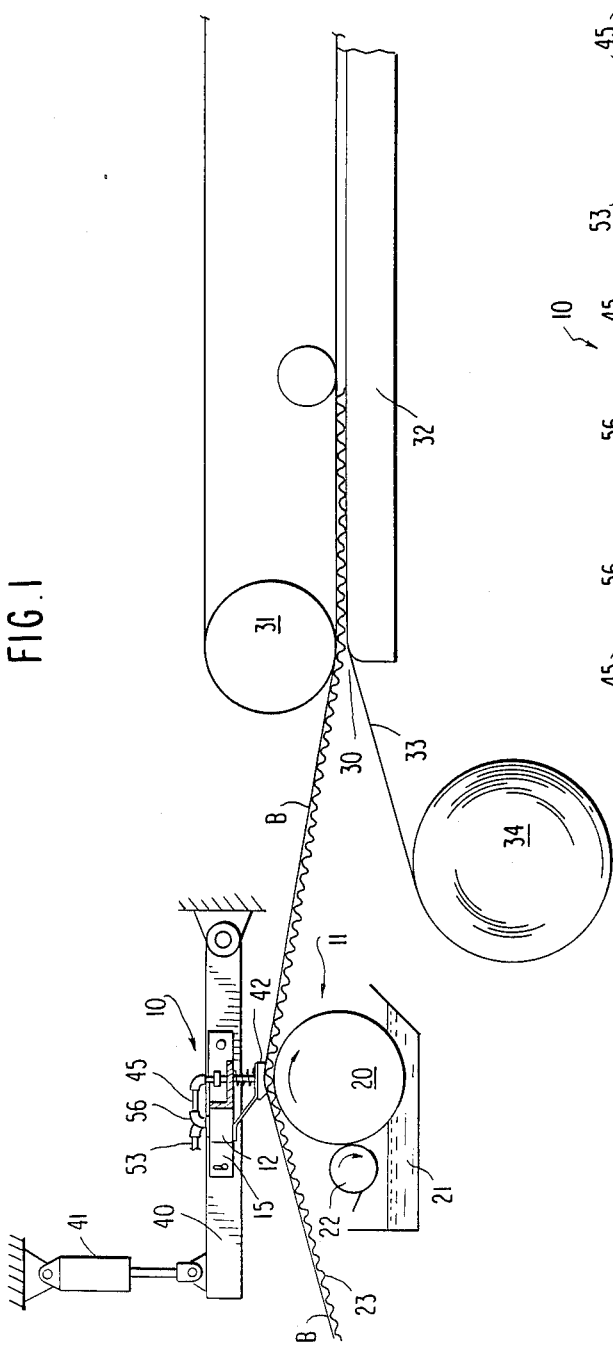
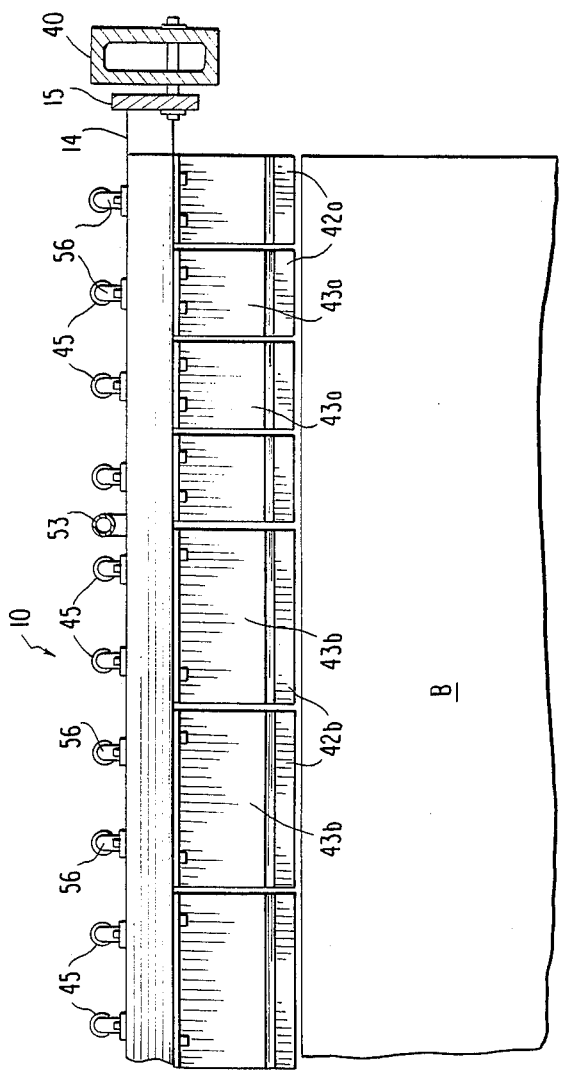

CORRUGATING MACHINE GLUE APPLICATOR

BACKGROUND OF THE INVENTION

1. Field of the Invention

The present invention relates to methods and apparatus for fabricating corrugated paperboard. More particularly, the present invention relates to a method and corresponding apparatus for applying back pressure to a single-faced corrugated web while in transit over a glue applicator roll. The applicator roll applies a film of adhesive to the exposed corrugation flute tips of the single-faced web in preparation for adding a second liner web to complete a double-faced assembly.

2. Description of the Prior Art

In the fabrication of corrugated paperboard, a first liner web or single facing is adhesively applied to the flute tips of the corrugated medium web while the medium web is still in intimate contact with the corrugating roll surface profile. Consequently, the single-facing web may be positively pressed into intimate contact with the corrugation flute crests of the medium by a high pressure roll nip without concern for either (a) crushing a portion of the corrugated web pattern by excessive contact pressure or (b) omitting a flute line of adhesion because of insufficient contact pressure.

After the single-facing web is applied and the corrugated medium stripped from the corrugated roll surface, the reverse face of the medium is no longer accessible to a corrugated backing profile in support of the medium for application of the double-facing web. Such absence of a positive backing support structure is particularly acute at the glue applicator station whereas adhesive for the double-facing web is applied to the exposed flute tips. Some pressure is required to hold the corrugated face of the continuously running, single-faced web assembly firmly against the applicator roll surface to assure that sufficient adhesive is applied along the full transverse length of each passing flute tip. However, excessive pressure will crush the fluted medium whereas insufficient pressure will permit skips in adhesive application.

Uncontrolled tendencies of a single-faced web assembly to warp transversely represents a major source of difficulty in back pressure regulation. When a fixed dimension gap setting is used between the glue roll surface and a corresponding backing roll surface to transversely flatten a warped, single-faced board for line contact with the flute tip glue applicator roll, a line of crushed flutes often results along either the board center or along either edge.

One prior art effort to control single-faced board back pressure at the double-face glue station has been to mount a backing roll approximately mid-span between two swing arms. One end of each swing arm is pivotally secured to the machine frame whereas the free ends of the arms are supported by fluid pressure. A fluid pressure control system supports substantially all of the roll weight applied against the singlefaced board.

More recently, it has been taught that a controlled air bearing pressure against a web line of single-faced board at the glue applicator roll provides a superior product in terms of reduced flute crushing and improved, full line, tip gluing. This teaching is represented by U.S. Pat. No. 4,617,076 to T. B. Jones, Jr. et al. Although the air bearing method of pressing single-faced board against a glue applicator roll is significantly superior to a rigid surface rider roll, room for further improvement remains. Working experience with such air bearing pressure source has revealed a tendency of the air bearing structure to bow away from the board plane from the middle to the ends. Flute crushing is eliminated but occasionally, the flute tip glue lines are incomplete along the board assembly edges.

Analysis of this air bearing malfunction suggested that the air bearing structure gets hotter along the bottom portion than the top. Asymmetric thermal expansion consequently produces a bow in the air bearing length to lift the bearing ends.

These air bearing assemblies have been constructed as an integral unit having wear shoes in intimate contact with an air supply manifold duct. A multiplicity of small diameter holes drilled through the shoe thickness and the duct floor vent supply air between the shoe base and the top surface of the running web of single-faced board. Theoretically, there should be no physical contact between the shoe base and the running board. In practice, however, conditions may develop to cause a light frictional drag of the board against the shoe base. Heat is thereby generated in the shoe structure which is conducted directly into the manifold floor. Such friction heat is generated more rapidly than the air flow can carry it away. Hence, the floor of the air bearing expands more than the top thereby causing the consequential bow.

In view of the aforedescribed operating difficulty with prior art air bearing designs, it is an objective of the present invention to provide an air bearing assembly that segregates the wear shoe portion of the unit from the air supply manifold portion.

Another object of the present invention is to longitudinally segment the wear shoe portion of an air bearing assembly into short, structurally independent units.

SUMMARY

These and other objects of the invention as will subsequently become apparent are derived from an air bearing assembly wherein the wear shoes are physically separated from the air supply manifold. The entire length of the wear shoe unit, i.e., the width of the board assembly, is segmented into three to six inch elements. Each wear shoe element is spring suspended from the air supply manifold independently of adjacent elements.

BRIEF DESCRIPTION OF THE DRAWINGS

Relative to the several FIGURES of the drawings, like reference characters designate like or similar elements throughout the several FIGURES:

FIG. 1 is an elevational schematic of a double-facer glue station incorporating the present invention and shown in combination with a double-facer machine;

FIG. 2 is a partial front elevation of the invention assembly;

DESCRIPTION OF THE PREFERRED EMBODIMENT

Figure 3:
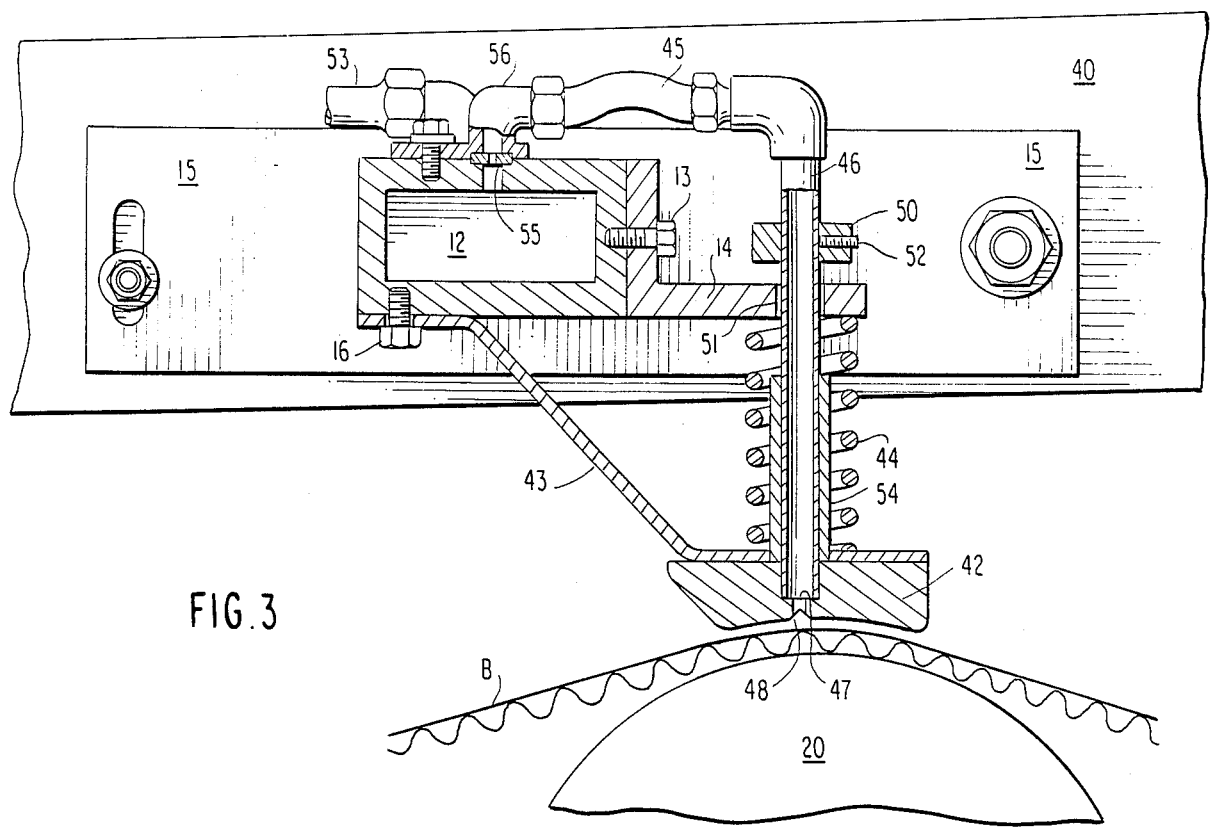
FIG. 3 is a sectional, end elevation of the invention.
Figure 4:
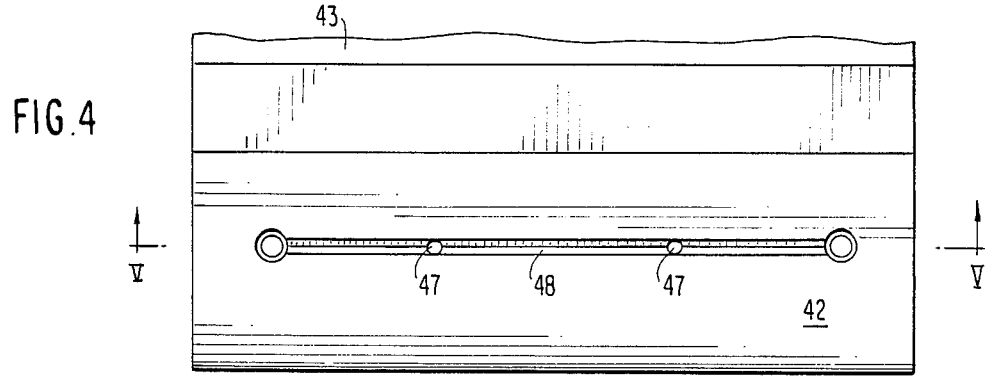
FIG. 4 is a plan of a shoe element underside.
Figure 5:
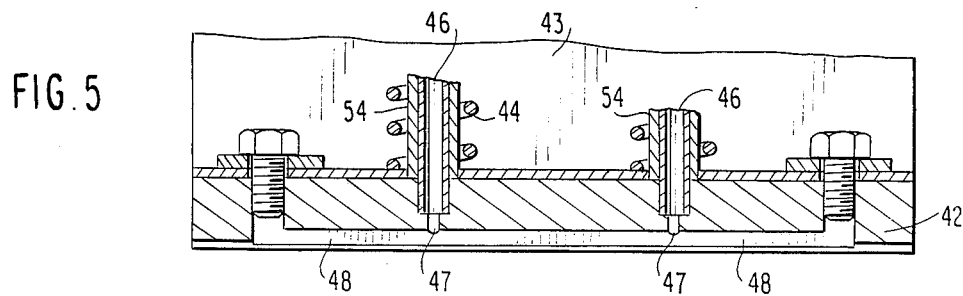
FIG. 5 is a sectional view of FIG. 4 taken along cutting plane V—V.

With reference to the schematic of FIG. 1, the present invention 10 is shown in operative combination with a double-facing glue station 11. A running web of single-faced corrugated board B is routed over a glue station applicator roll 20 that rotates partially immersed in a pond 21 of liquid adhesive. Liquid film picked up on the surface of roll 20 is metered to a precise thickness by doctor roll 22. Such film is thereafter delivered into contact with the exposed flute tips 23 of the single-faced web B.

From the glue station, the single-faced web is routed to the entrance nip 30 between a belt hold-down pulling roll 31 and a pressure platten 32. Merging with the single-faced web B in the double-facer nip 30 is a liner web 33 drawn from a supply roll 34. Glue applied to the exposed flute tips of the single-faced web secures those tips to the liner web 33 to form a finished product of double-faced corrugated board.

The present invention 10 contributes to the foregoing process by providing hold-down pressure against the lined backside of the single-faced web to press the exposed, corrugated medium flute tips firmly and uniformly against the glue applicator roll surface for uniform and continuous glue film pick-up.

For this purpose, the invention is secured between two swing arms 40; both of which are pivotally secured to the machine frame at one end thereof. The opposite or distal ends of the swing arms 40 are positioned by double acting fluid struts 41. These fluid struts 41 are pressure regulated to hold the swing arm ends at a predetermined position under normal running load but yield to excessive loads or, conversely, apply loading pressure to the hold-down assembly 10.

Relative to FIGS. 2 and 3 the invention is seen as comprising a single, continuous manifold 12 secured by welding or machine screws 13 to an angle beam 14. Respective ends of the angle beams are welded to corresponding adjusting brackets 15 by which the assembly 10 is secured to the swing arms 40. Wear shoe segments 42a and 42b are generally confined by respective single leaf springs 43a and 43b which are dependently secured to the manifold 12 by machine screws 16. Coil springs 44 also contribute to the compliant positionment of the wear shoes 42a and 42b.

With specific reference to the front elevation of FIG. 2, it is seen that the shoe and spring segments 42b and 43b are approximately twice the length of segments 42a and 43a. Representatively, the length of six inches has been successfully used for shoe segments 42b and three inches for segments 42a.

Bearing support air is supplied to each of these shoe segments from the manifold 12 by a conduit system illustrated in detail by FIG. 3 which comprises a flexible hose section 45 and a rigid tube section 46. The lower end of the rigid tube 46 threads into a corresponding shoe socket. Air flow from the conduit system into a distribution slot 48 along the shoe bottom is admitted by an aperture 47. Air flow rate through each conduit system is controlled by respective orifice plates 55 clamped between the face of a flanged elbow 56 and the top of manifold 12. The longer shoe segments 42b may be supplied with two or more such conduit systems whereas the short segments may require only one as shown by FIG. 2.

Specific wear shoe lengths are chosen for convenience and width of the single-faced web B. Web widths less than a full shoe length allow those shoes near the machine outer edges having no underrunning web to drop down against the abutment surface of a set-screw collar 50. This protects the gravured surface of the applicator roll 20 from metal-to-metal contact with the shoe 42.

Each tube 46 passes through a respective aperture 51 in the angle beam 14 thereby providing an abutment surface for the collar 50 against the expansive bias of springs 43 and 44. The outer surface of each tube is smooth to slidably receive a respective collar 50. When exactly positioned where required along the length of tube 46, the set-screw 52 locks the collar from further movement.

To limit the shoe movement from excessive upward movement against the spring bias, a sleeve 54 surrounds the lower end of the tube 46 internally of the coil spring 44. The upper end of sleeve 54 abuts the bottom side of angle beam 14 upon extreme displacement.

One and preferably more conduits 53 supply the manifold 12 with low pressure air to maintain a 10-20 psi manifold pressure. Air flow discharge is controlled by the size of orifices 55. It may be found from operating a specific unit of the invention that different orifice sizes are required for specific shoe segments. As a general rule, the minimum air flow necessary to accomplish the board hold-down objective is most suitable. However, the operating principle of air bearing systems is not air impulse but distributed air pressure. This distinction is significant to operating circumstances which require a substantial down loading from the strut 41 so that a greater distributed pressure may be maintained between the shoes 42 and the board web B.

Having fully described the preferred embodiments of my invention, I claim:

1. In combination with an apparatus for continuously applying a second facing web to an exposed face plane of corrugated flute tips on a continuously produced line of single-faced corrugated paperboard, a glue station having an adhesive applicator roll for applying adhesive to said exposed, corrugated flute tips, said glue station including backing force means for exerting a force bias on said single-faced production line to press said exposed flute tips substantially radially against the length of said adhesive applicator roll, said backing force means comprising air manifold means secured in a position proximate of said glue station to extend substantially parallel with a rotational axis of said roll, the improvement comprising a plurality of air bearing shoes aligned along the length of said applicator roll to apply said force bias against said single-faced production line, independent resilient positioning means respective to each air bearing shoe for laterally and longitudinally confining the location of each shoe and conduit means respective to each of said shoes for applying pressurized air thereto from said air manifold means.

2. An apparatus as described by claim 1 wherein said resilient positioning means exerts a spring bias force on said respective shoe toward said applicator roll.

3. An apparatus as described by claim 1 wherein each air bearing shoe comprises a channel in the bottom surface thereof facing said single-faced production line, said channel being aligned substantially parallel with said applicator roll axis and blocked at opposite ends of said shoe, said conduit means opening into said channel.

4. An apparatus as described by claim 1 wherein the length of said air bearing shoes parallel with said applicator roll axis is less in the proximity of the single-faced production line edges than the length of shoes in the proximity of the mid-portion of said production line.

5. An apparatus as described by claim 1 wherein said resilient positioning means is structurally secured between said air manifold means and said shoe means.

6. An apparatus as described by claim 5 wherein said conduit means comprises a rigid conduit section secured at one end thereof to a respective shoe and a distal end thereof projected through a stationary structural aperture.

7. An apparatus as described by claim 6 where said rigid conduit section comprises abutment surfaces along the length thereof to limit movement of said conduit through said aperture.

8. A method of applying a second liner web to a moving web of single-faced corrugated paperboard having an exposed, corrugated surface and a smooth surface, said method comprising the steps of:

(a) routing flute tip elements of said corrugated surface into a line contact with an adhesive coated surface of a rotating glue applicator roll;
(b) positioning a plurality of air bearing shoe elements proximately of said smooth surface along said line of contact;
(c) resiliently biasing each of said shoe elements, independently of other said shoe elements, toward said smooth surface; and,
(d) providing a sufficient air flow between each of said shoe elements and said smooth surface to support said shoe elements from normal contact with said smooth surface against the force of said resilient bias.

* * * * *